US007119040B2

(12) United States Patent
Baba-Kishi-Zadeh et al.

(10) Patent No.: US 7,119,040 B2
(45) Date of Patent: Oct. 10, 2006

(54) DIELECTRIC COMPOSITES AND METHODS OF MAKING SUCH

(75) Inventors: Karim Baba-Kishi-Zadeh, Hong Kong SAR (CN); Cheuk-Wai Tai, Hong Kong SAR (CN)

(73) Assignee: The Hong Kong Polytechnic University, Hong Kong (CN)

( * ) Notice: Subject to any disclaimer, the term of this patent is extended or adjusted under 35 U.S.C. 154(b) by 53 days.

(21) Appl. No.: 10/898,381

(22) Filed: Jul. 26, 2004

(65) Prior Publication Data

US 2006/0019818 A1 Jan. 26, 2006

(51) Int. Cl.
*C04B 35/495* (2006.01)
*H01L 41/187* (2006.01)

(52) U.S. Cl. ................................ 501/135; 252/62.9 PZ

(58) Field of Classification Search ................ 501/135; 252/62.9 PZ

See application file for complete search history.

(56) References Cited

U.S. PATENT DOCUMENTS 5,337,209 A * 8/1994 Sutherland et al. ...... 361/321.5
5,345,139 A * 9/1994 Gururaja et al. ............ 310/358
6,300,267 B1 * 10/2001 Chen et al. ................ 501/135

FOREIGN PATENT DOCUMENTS

| | | | |
|---|---|---|---|
| JP | 3-137056 | * | 6/1991 |
| KR | 2001026107 | * | 4/2001 |

* cited by examiner

*Primary Examiner*—Karl Group
(74) *Attorney, Agent, or Firm*—Buchanan Ingersoll & Rooney PC

(57) ABSTRACT

Most of the dielectric ceramic compositions consist of three or more different lead-based or non-lead ceramics. These materials and their solid solutions can give high dielectric constants (er>10000) but the disadvantage is large fluctuations in the dielectric constant with increasing or decreasing temperature. Most applications of these materials are therefore concentrated on the utilization of their dielectric constants at a specific temperature. This invention provides a dielectric composite of the general formula $(x)[Pb(In_{1/2}Nb_{1/2})O_3]:(1-x)[Pb(Mg_{1/3}Nb_{2/3})O_3]$ having improved stability of dielectric constant in the working temperature range.

7 Claims, 3 Drawing Sheets

PINM3070 with dopants (1kHz)

2% Ba
5% Ba
2% La
5% La
2% Sr
5% Sr

DIELECTRIC COMPOSITES AND METHODS OF MAKING SUCH

FIELD OF THE INVENTION

This invention relates to dielectric ceramic lead composites, particularly those having relatively high dielectric constants.

BACKGROUND OF THE INVENTION

Most lead-based perovskite compounds yield high dielectric constant, e.g., $\epsilon_r$>2000, which is the requirement for small capacitors in microelectronic industry. An advantage of the lead-based materials is low sintering temperature, which is typically below 1200° C. Since these lead-based ceramics have a wide range of Curie temperatures, a multilayer ceramic capacitor can be fabricated in different layers to meet the required temperature by integrating the overall properties of the multilayer.

Most of the dielectric ceramic compositions consist of three or more different lead-based or non-lead ceramics. In addition, in many cases, small amounts of some other elements are required to modify the main solid solution. Lead magnesium niobate $Pb(Mg_{1/3}Nb_{2/3})O_3$, lead nickel niobate $Pb(Ni_{1/3}Nb_{2/3})O_3$, lead zirconate $PbZrO_3$ and lead titanate $PbTiO_3$ are widely used as dielectric ceramic compositions. These materials and their solid solutions can give high dielectric constants ($\epsilon_r$>10000) but the disadvantage is large fluctuations in the dielectric constant with increasing or decreasing temperature. Most applications of these materials are therefore concentrated on the utilization of their dielectric constants at a specific temperature. For example, lead magnesium niobate, lead nickel niobate and lead titanate, which are mentioned in the U.S. Pat. No. 5,275,988. The addition of strontium, barium and calcium ions to ternary ceramics replaces some of the Pb ions, enabling modification of the dielectric and temperature properties. The modified ternary ceramic systems exhibit high dielectric constants ($\epsilon_r$>10000) and satisfying the Y5U characteristics (−30° C. to 85° C., ΔC/C (25° C.), +22% to −56%). In U.S. Pat. No. 5,633,215, the main components of the dielectric composition consist of lead magnesium tungstate ($Pb(Mg_{1/2}W_{1/2})O3$), lead zirconate and lead titanate and at least one rare-earth oxide additive. The dielectric constants of these compositions vary from 1600 to 6800 but the variations in the dielectric constant at −30° C. and 85° C. are large. Typical variations are about 15% or more. Another U.S. Pat. No. 5,861,350 claims reasonably high dielectric constant (~4000 to 10000) but the temperature stability falls within ±30%.

OBJECTS OF THE INVENTION

Therefore, it is an object of this invention to provide a dielectric composition having improved stability in the dielectric constant at the working temperatures. As a minimum, it is an object of this invention to provide the public with a useful choice.

SUMMARY OF THE INVENTION

Accordingly, this invention provides a composite comprising essentially:

lead indium niobate, $[Pb(In_{1/2}Nb_{1/2})O_3]$;

lead magnesium niobate, $[Pb(Mg_{1/3}Nb_{2/3})O_3]$; and at least one dopant metal ion to replace lead ion in an amount of 2 to 5 mole percent, the metal ion being selected from the group consisting of Ba, Sr, Ti, Yb, La, Na, and their combinations thereof;

and being expressed by the following general formula $(x)[Pb(In_{1/2}Nb_{1/2})O_3]:(1-x)[Pb(Mg_{1/3}Nb_{2/3})O_3]$. Preferably, x is from 0.3 to 0.7.

This invention also provides a method of manufacturing a composite, that includes the steps of:

calcinating a mixture of lead(II) oxide [PbO], indium(III) oxide $[In_2\mathbf{0}_3]$, magnesium(II) oxide [MgO], and niobium(V) oxide $[Nb_2O_5]$;

adding oxide of at least one dopant metal ion to replace lead ion in an amount of 2 to 5 mole percent, said metal ion being selected from the group consisting of Ba, Sr, Ti, Yb, La, Na, and their combinations thereof, before the mixture is calcinated; and then sintering the mixture.

The mixture is calcinated at about 800° C. to 900° C. for about two to four hours. The mixture is sintered at about 1050° C. to 12350° C. for about one to two hours.

BRIEF DESCRIPTION OF THE DRAWINGS

Preferred embodiments of the present invention will now be explained by way of example and with reference to the accompanying drawings in which.

DETAILED DESCRIPTION OF THE PREFERRED EMBODIMENT

This invention is now described by way of example with reference to the figures in the following paragraphs.

Objects, features, and aspects of the present invention are disclosed in or are obvious from the following description. It is to be understood by one of ordinary skill in the art that the present discussion is a description of exemplary embodiments only, and is not intended as limiting the broader aspects of the present invention, which broader aspects are embodied in the exemplary constructions.

Figure 1:
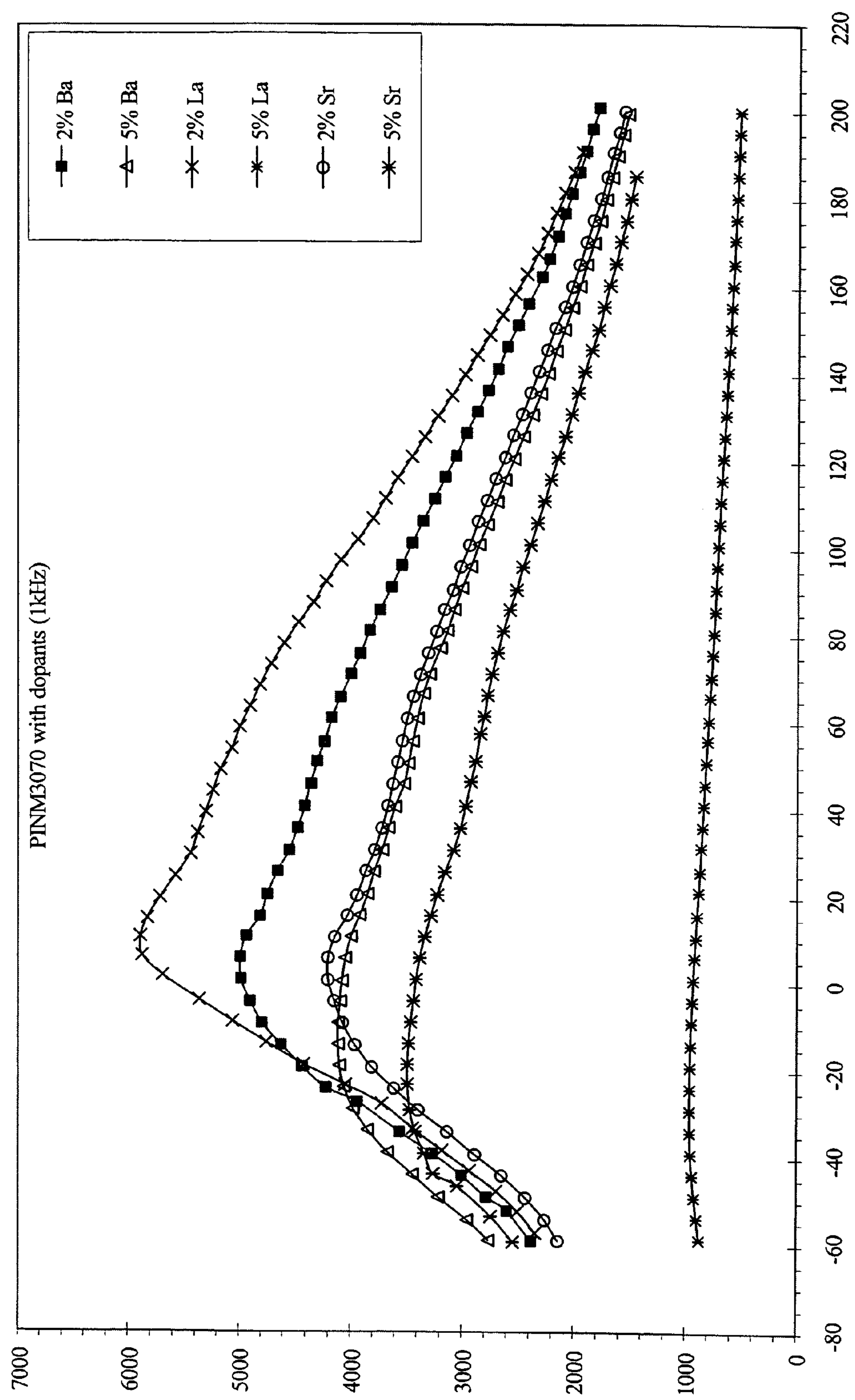
FIG. 1 shows the dielectric constants of the doped $0.3Pb(In_{1/2}Nb_{1/2})O_3:0.7Pb(Mg_{1/3}Nb_{2/3})O_3$ ceramics plotted against temperature from −60° C. to 200° C., wherein the dopants are: 2% and 5% Ba, 2% and 5% La and 2% and 5% Yb.
Figure 2:
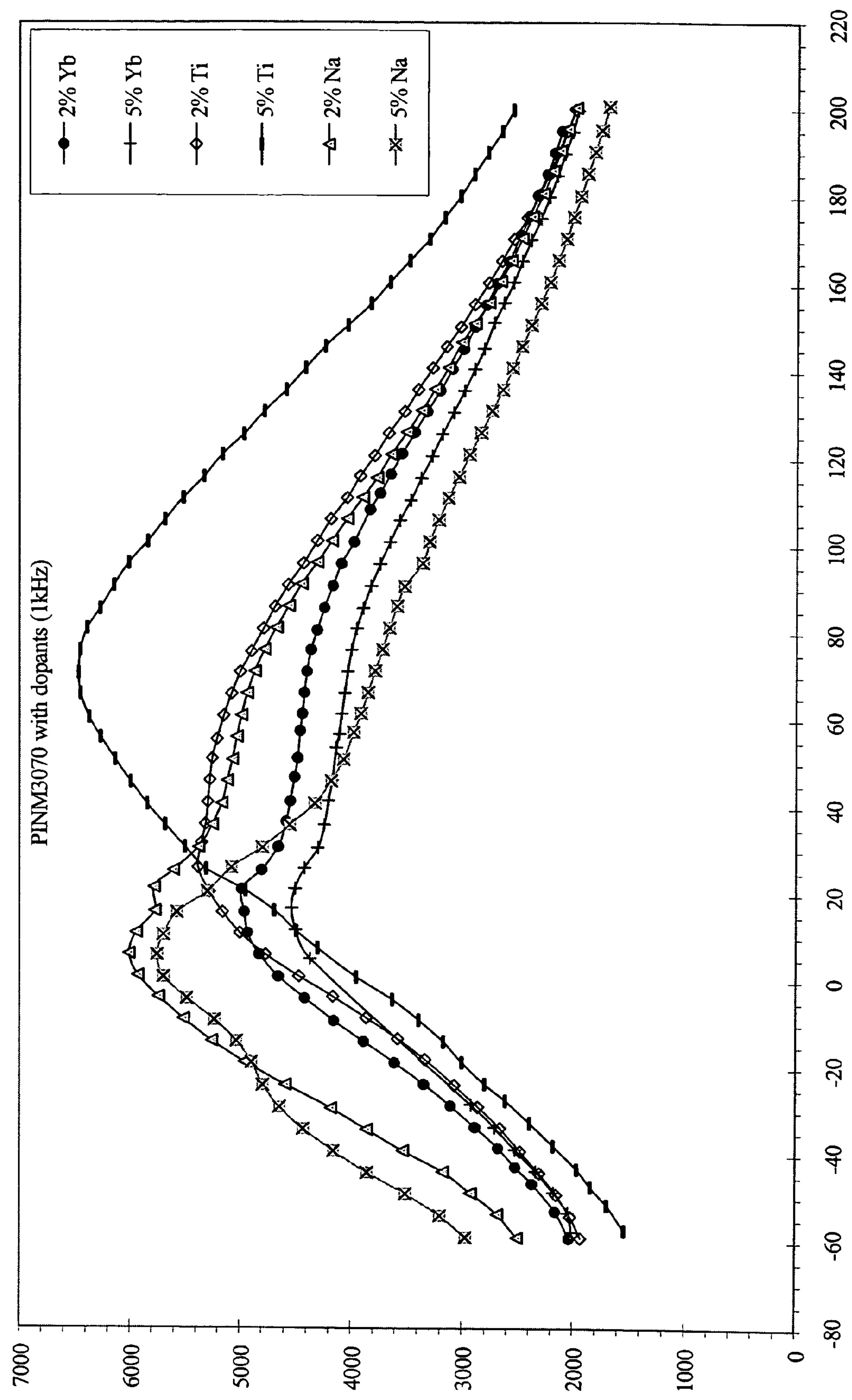
FIG. 2 shows the dielectric constants of the doped $0.3Pb(In_{1/2}Nb_{1/2})O_3:0.7Pb(Mg_{1/3}Nb_{2/3})O_3$ ceramics ceramics doped with 2% Ti, 5% Ti, 2% Sr, 5% Sr, 2% Na and 5% Na.
Figure 3:
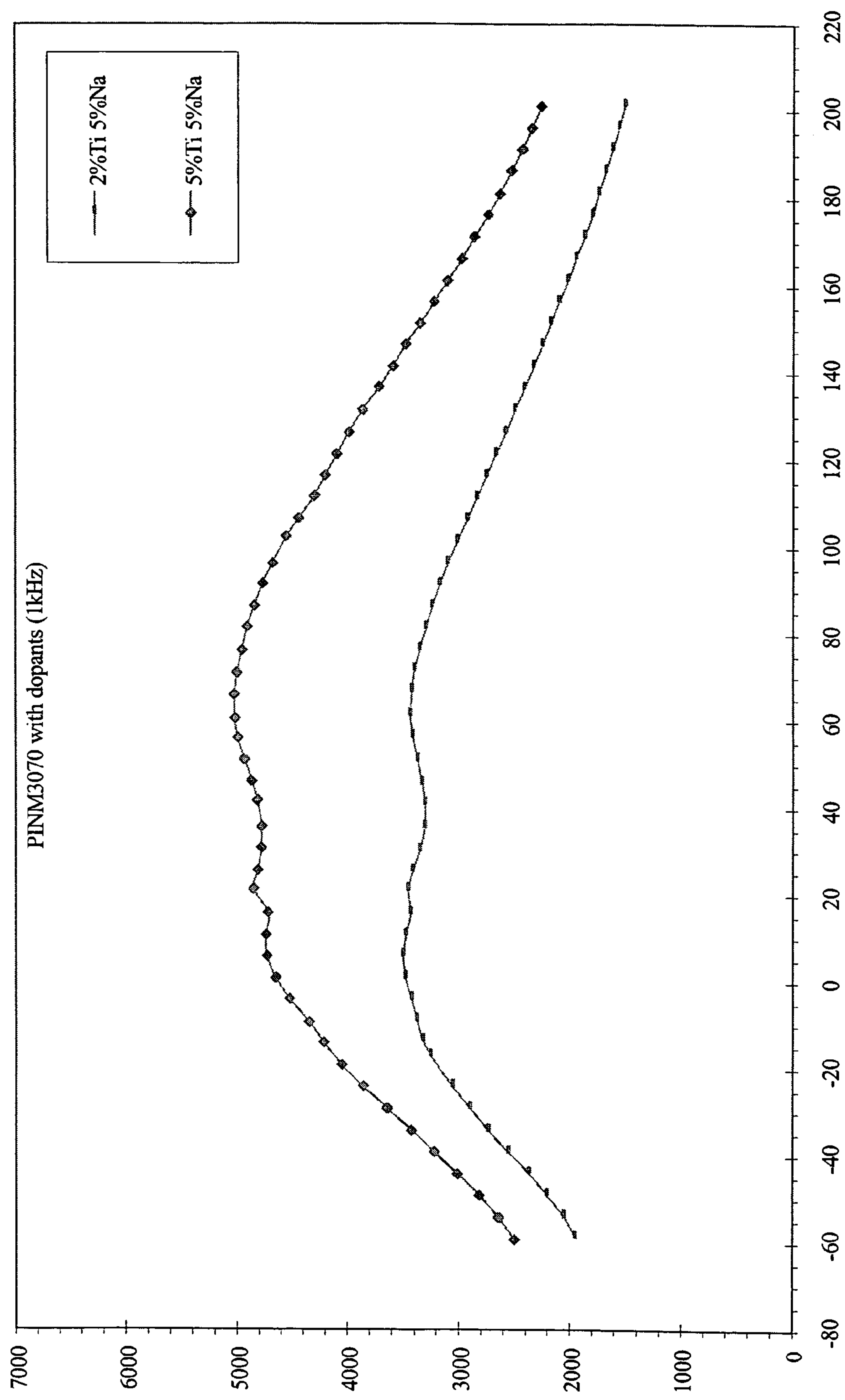
FIG. 3 shows the dielectric constants of the doped $0.3Pb(In_{1/2}Nb_{1/2})O_0:0.7Pb(Mg_{1/3}Nb_{2/3})O_3$ ceramics ceramics doped with 2% Ti+5% Na and 5% Ti+5% Na.

The base ceramic dielectric composite is $(x)Pb(In_{1/2}Nb_{1/2})O_3-(1-x)Pb(Mg_{1/3}Nb_{2/3})O_3$ with x=0.3 to 0.7. Additionally, the composite may contain at least one metal ion as a dopant. These ions incorporated in the base ceramic are Ba, Sr, Ti, Yb, La and Na. The starter materials used can be the oxides or carbonates of $BaCO_3$, SrO, $TiO_2$, $Yb_2O_3$, $La_2O_3$ and $NaCO_3$, which contain the dopants. The mole percentage of one particular dopant added into the base ceramic does not exceed 5 mole percent, as shown in FIGS. 1, 2 and 3 and Table 1. It is found that it may be difficult to maintain the temperature stability and the pseudo-cubic crystal structure of the solid solutions if more than 5 mole % of the dopant is added.

The composite of this invention can be manufactured by mixing lead(II) oxide [PbO], indium(III) oxide [$In_2O_3$], magnesium(II) oxide [MgO] according to the above stoichiometric ration, and then calcinated at above 800° C., preferably at about 800° C. to 900° C. for about two to four hours, and then sintered at above 1000° C., preferably about 1050° C. to 1250° C. for about one to two hours. If dopants are required to present in the composite, the dopants may be added in the oxide form of $BaCO_3$, SrO, $TiO_2$, $Yb_2O_3$, $La_2O_3$ and $NaCO_3$ before calcinations.

In the ceramics, doped with 2% or 5% Ba, the A-site of the perovskite structure, which is normally occupied by Pb, is partially replaced by Ba. The 2% Ba-doped ceramic exhibit higher $\epsilon_r$ than the base ceramic below 80° C., but notability, the change in $\epsilon_r$ close to $\epsilon_{max}$ is rapid. The 5% Ba-doped ceramic exhibit better $\epsilon_r$ performance below the Curie temperature (0° C.) but the values and the changes in $\epsilon_r$ above the Curie temperature were not as significant as the base ceramic, FIG. 1.

In the ceramics doped with 2% or 5% Sr, the Curie temperature, as well as the maxima of the $\epsilon_{max}$ were decreased. The new Curie temperature was about −40° C. (for 5% Sr). The drop in the rate of $\epsilon_r$ also showed an increase, FIG. 2.

In the ceramics doped with 2% or 5% Na to partially replace Pb in the A-site of perovskite structure. The 2% Na-doped ceramics has a higher Er at any temperature compared to the base ceramic but the temperature stability was degraded. The 5% Na-doped ceramic shows more complicated behavior. At lower temperature range (−30° C. or below), the $\epsilon_r$ is the highest. After the Curie temperature around 0° C., the drop rate of $\epsilon_r$ was quite rapid until 70° C., FIG. 2.

The addition of 2% or 5% Ti dopant partially replaced Mg, In or Nb in the B-sites of perovskite structure. The Curie temperature and dielectric constant were increased. This increase was dependent on the molar percentage of Ti. At higher concentration of Ti, both the Curie temperature and $\epsilon_r$ were higher. No plateau and single-phase transition were found in the 5% Ti ceramic, FIG. 2.

The addition of 2% Yb dopant caused an increase in the Curie temperature and $\epsilon_r$. However, the addition of 5% Yb, caused a drop in the $\epsilon_r$ compared with the 2%, but the values were still higher than the unmodified ceramic. The Curie temperature of the 5% Yb doped ceramic was identical to that of the 2% doped ceramic, FIG. 1.

The ceramics doped with a combination of Na and Ti were fabricated by mixing the base ceramic with pre-calcined Na-doped and Ti-doped powders. The 2% Na+5% Ti-doped ceramics showed a lower $\epsilon_r$ compared with 5% Na+5% Ti doped ceramics. However, the temperature stability was improved significantly. The variation was less than 15% at −20 to 105° C. The value of $\epsilon_r$ did not drop below 2800. The 2% Na+5% Ti doped ceramics showed significant improvement in $\epsilon_r$ and temperature stability. The minimum $\epsilon_r$ was 3500 and its variation was less than 7% −20 to 105° C., FIG. 3.

The temperature stability of the lead-based perovskite-structured ceramics $(x)Pb(In_{1/2}Nb_{1/2})O_3:(1-x)Pb(Mg_{1/3}Nb_{2/3})O_3$ with x=0.3 to 0.7 is significantly improved by adding different amounts of the dopants. These ceramics are relatively simple binary systems with high dielectric constant ($\epsilon r$>3000) exhibiting temperature stability. The base ceramic without any additive fulfills Z5P (10° C. to 85° C., ΔC/C (25° C.), ±10%). The composition, for example, $(x)Pb(In_{1/2}Nb_{1/2})O_3:(1-x)Pb(Mg_{1/3}Nb_{2/3})O_3$ with x=0.3 meets the specification Z5P (10° C. to 85° C., AC/C (25° C.), ±10%) and Z6R (10° C. to 105° C., ΔC/C (25° C.), ±15%), while retaining high dielectric constants. These outstanding dielectric and temperature properties can be applied to fabricate single ceramic capacitors with good temperature stabilities and to replace layered materials containing various dielectrics in a multilayer ceramic capacitor, thus reducing the capacitor size and the cost of fabrication.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

TABLE 1

Dielectric constants of the doped PINM3070 ceramics at specific temperatures and their percentage changes. The EIA-198E standard fulfilled by each ceramic is shown in the last column.

| Element % | 25° C . | −30° C. | 10° C. | 85° C. | 105° C. | 125° C. | Δ(−30° C.) % | Δ(10° C.) % | Δ(85° C.) % | Δ(105° C.) % | Δ(125° C.) % | EIA-198 Standard |
|---|---|---|---|---|---|---|---|---|---|---|---|---|
| 2% Ba | 4645.8 | 3748.2 | 4753.6 | 3746.7 | 3367.6 | 2983.9 | −19.3 | 2.3 | −19.4 | −27.5 | −35.8 | Y5S, Z5S |
| 5% Ba | 3784.7 | 3911.5 | 4002.4 | 3077.6 | 2773.8 | 2450.1 | 3.4 | 5.8 | −18.7 | −26.7 | −35.3 | Y5S, Z5S |
| 2% La | 5571.9 | 3574.1 | 5886.3 | 4397.3 | 3846.5 | 3329.1 | −35.9 | 5.6 | −21.1 | −31.0 | −40.3 | — |
| 5% La | 869.5 | 959.9 | 905.4 | 736.1 | 698.4 | 664.0 | 10.4 | 4.1 | −15.3 | −19.7 | −23.6 | Y5S, Z5S, Y6S, Z6S |
| 2% Yb | 4799.6 | 3043.7 | 4908.9 | 4246.8 | 3889.5 | 3446.0 | −36.6 | 2.3 | −11.5 | −19.0 | −28.2 | Z5R, Z6S |
| 5% Yb | 4417.1 | 2855.1 | 4464.8 | 3887.8 | 3559.8 | 3190.2 | −35.4 | 1.1 | −12.0 | −19.4 | −27.8 | Z5R, Z6S |
| 2% Ti | 5380.3 | 2817.0 | 4954.7 | 5207.9 | 4892.8 | 3676.5 | −47.6 | −7.9 | −3.2 | −9.1 | −31.7 | Z5P, Z6P |
| 5% Ti | 5308.5 | 2632.2 | 4423.2 | 6267.4 | 5684.1 | 4980.1 | −50.4 | −16.7 | 18.1 | 7.1 | −6.2 | Z5S, Z6S, Z7S |
| 2% Sr | 3861.0 | 3336.2 | 4137.5 | 3168.4 | 2870.5 | 2547.5 | −13.6 | 7.2 | −17.9 | −25.7 | −34.0 | Y5S, Z6S |
| 5% Sr | 3152.5 | 3452.3 | 3335.5 | 2581.5 | 2333.7 | 2081.2 | 9.5 | 5.8 | −18.1 | −26.0 | −34.0 | Y5S, Z6S |
| 2% Na | 5604.4 | 4131.9 | 5957.2 | 4578.8 | 4062.2 | 3521.4 | −26.3 | 6.3 | −18.3 | −27.5 | −37.2 | Z5S |
| 5% Na | 5075.3 | 4601.8 | 5702.7 | 3595.2 | 3226.0 | 2850.9 | −9.3 | 12.4 | −29.2 | −36.4 | −43.8 | — |
| 5% Na + 2% Ti | 3409.9 | 2863.9 | 3473.2 | 3241.5 | 2916.9 | 2587.1 | −16.0 | 1.9 | −4.9 | −14.5 | −24.1 | Y5S, Y6S, Z5F, Z6R |

TABLE 1-continued

Dielectric constants of the doped PINM3070 ceramics at specific temperatures and their percentage changes. The EIA-198E standard fulfilled by each ceramic is shown in the last column.

| Element % | 25° C. | −30° C. | 10° C. | 85° C. | 105° C. | 125° C. | Δ(−30° C.) % | Δ(10° C.) % | Δ(85° C.) % | Δ(105° C.) % | Δ(125° C.) % | EIA-198 Standard |
|---|---|---|---|---|---|---|---|---|---|---|---|---|
| 5% Na + 5% Ti | 4809.6 | 3597.9 | 4733.6 | 4856.9 | 4475.5 | 4007.9 | −25.2 | −1.6 | 1.0 | −6.9 | −16.7 | Z5C, Z6F, Z7S |

The invention claimed is:

1. A composite comprising essentially of:

lead indium niobate, $[Pb(In_{1/2}Nb_{1/2})O_3]$; and lead magnesium niobate, $[Pb(Mg_{1/3} Nb_{2/3})O_3]$ at least one dopant metal ion to replace lead ion in an amount of 2 to 5 mole percent, said metal ion being selected from the group consisting of Ba, Sr, Ti, Yb, La, Na, and their combinations thereof and being expressed by the following general formula $(x)[Pb(In_{1/2}Nb_{1/2})O_3]:(1-x)[Pb(Mg_{1/3}Nb_{2/3})O_3]$, where $0<x<1$.

2. The composite of claim 1,wherein x is from 0.3 to 0.7.

3. A method of manufacturing the composite of claim 1 including the steps of:

calcinating a mixture of lead(II) oxide [PbO], indium(III) oxide $[In_2O_3]$, magnesium(II) oxide [MgO], and niobium(V) oxide $[Nb_2O_5]$;

adding oxide of at least one dopant metal ion to replace lead ion in an amount of 2to 5mole percent, said metal ion being selected from the group consisting of Ba, Sr, Ti, Yb, La, Na, and their combinations thereof, before the mixture is calcinated; and then sintering the mixture.

4. The method of claim 3, wherein the mixture is calcinated at about 800° C. to 900° C.

5. The method of claim 4, wherein the mixture is calcinated for about two to four hours.

6. The method of claim 3, wherein the mixture is sintered at about 1050° C. to 1250° C.

7. The method of claim 6, wherein the mixture is sintered for about one to two hours.

* * * * *